United States Patent [19]
Ogasawara et al.

[11] 3,722,634
[45] Mar. 27, 1973

[54] DISC BRAKE ANTI SQUEAL MEANS

[75] Inventors: Takeo Ogasawara, Nagoya; Masakazu Ishikawa, Toyota, both of Japan

[73] Assignees: Kabushiki Kaisha Toyota Chuo Kenkyusho, Nagoya-shi, Aichi-ken; Toyota Jidosha Kogyo Kabushiki Kaisha, Toyota-shi, Aichi-ken, Japan

[22] Filed: Sept. 18, 1970

[21] Appl. No.: 73,358

[30] Foreign Application Priority Data

Sept. 29, 1969  Japan..................................44/78019

[52] U.S. Cl.....................188/73.5, 92/129, 188/1 B, 188/264 G, 192/30 V
[51] Int. Cl.............................................F16d 65/00
[58] Field of Search........188/264 G, 73.5, 73.1, 72.4, 188/72.5, 1 B, 217; 192/30 V, 113 A, 109 A; 92/84, 129

[56] References Cited

FOREIGN PATENTS OR APPLICATIONS 634,625   2/1962   Italy.....................................188/217

Primary Examiner—George A. Halvosa
Attorney—Berman, Davidson and Berman

[57] ABSTRACT

A disc brake of simple construction wherein an intermediate member is interposed between the brake pad and the brake actuating piston. Anti-friction means extends between the transverse adjacent surfaces of the piston and the intermediate member so that vibrations from the brake pad are thus not transmitted to the piston and brake squeal is effectively eliminated.

16 Claims, 11 Drawing Figures

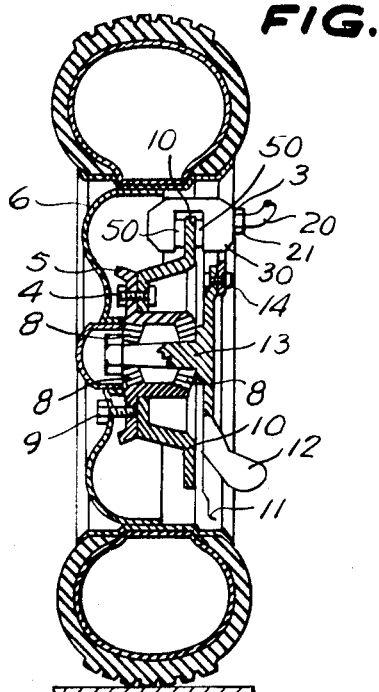
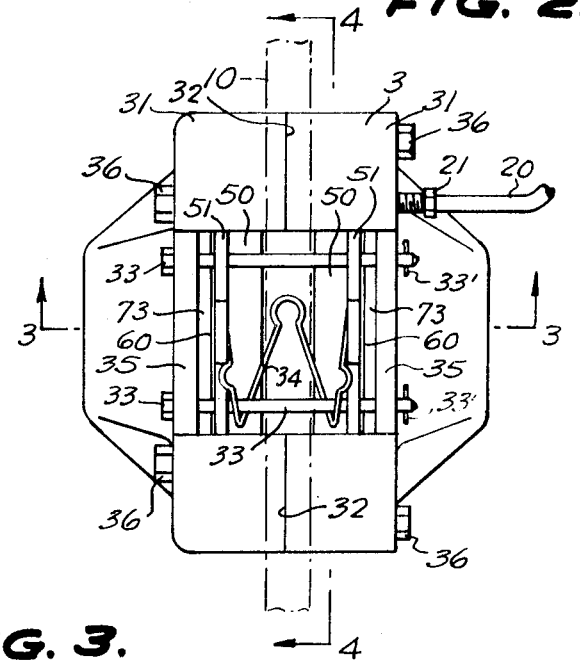
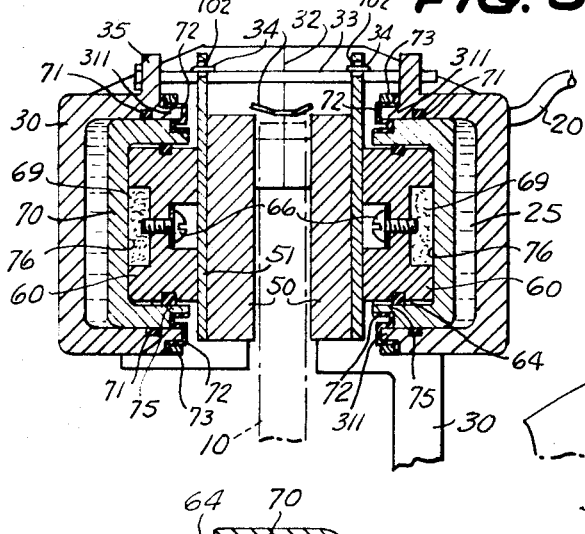
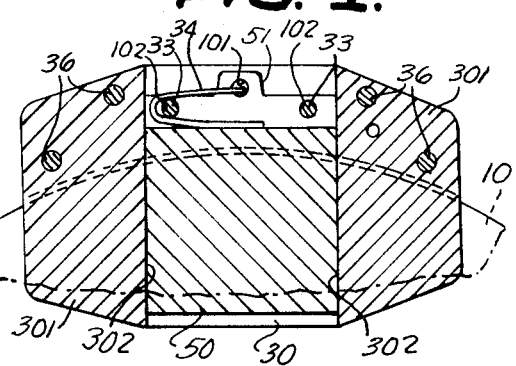
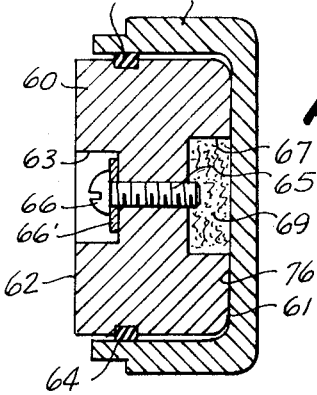

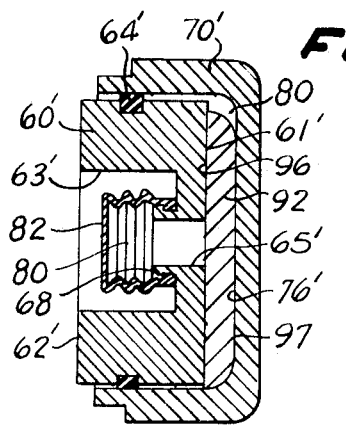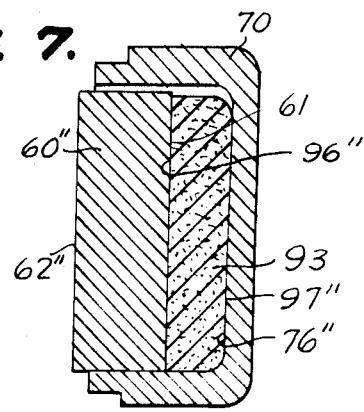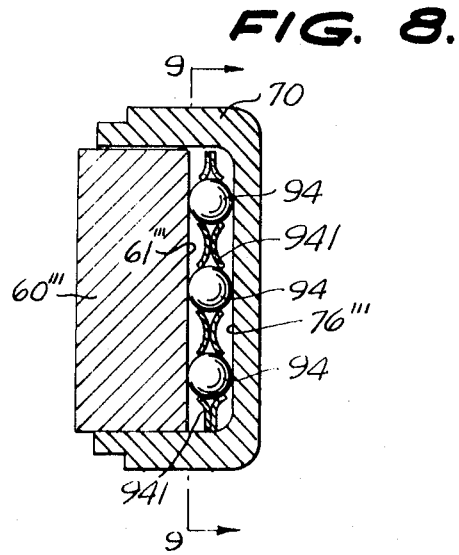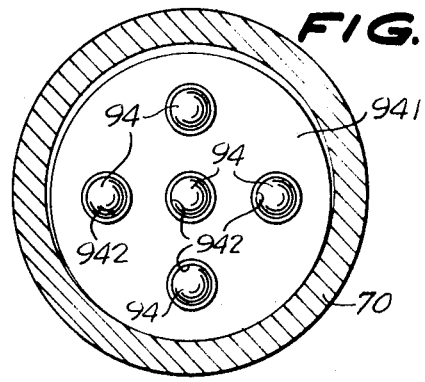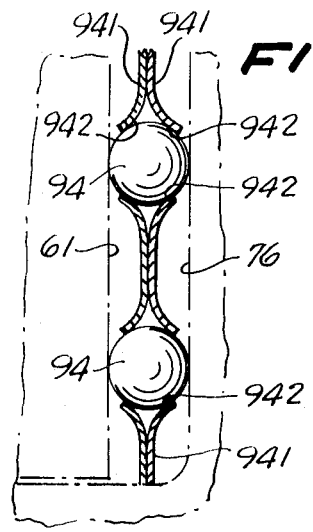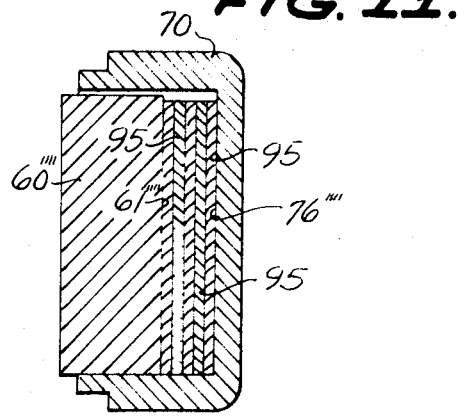

3,722,634

DISC BRAKE ANTI SQUEAL MEANS

BACKGROUND OF THE INVENTION

The present invention relates to disc brakes of the type in which at least one friction pad is engaged with the opposed surface of a brake disc on a motor vehicle wheel, or the like. At least one piston is arranged on the side of the pad opposite the disc. Hydraulic actuating means press the piston against the pad and the pad against the disc to brake its rotation.

In conventional disc brakes of the above-described type, an uncomfortable and objectionable "brake squeal" occurs when the brakes are applied.

A great many attempts have been made heretofore in the improvement of the frictional material of the pad and the method of damping the pad, none of which, however, has accomplished the essential object of preventing the brake squeal.

The present invention has been achieved by experiment and analysis from which it was learned that the movements and the elastic deformation of the various parts of the brake system at the time of occurrence of brake squeal are very complicated.

The frequency of brake squeal, as measured, was in the order of kilocycles per second, so that when the low frequency vibrations were excluded, it was determined that the coupled vibrations of the pistons, pads, caliper and disc are the cause of occurrence of the brake squeal.

SUMMARY OF THE INVENTION

Brake squeal has been effectively eliminated in the disc brakes of the instant invention by interposing an intermediate member between the brake pad and the brake actuating piston with the adjacent surfaces of the intermediate member and piston being separated by anti-friction means. Vibrations from the brake pad are not transmitted from the intermediate member to the piston due to the antifriction means and brake squeal is thus effectively eliminated.

The primary object of the invention is to provide disc brakes in which brake squeal is eliminated.

Other objects and advantages will become apparent in the following specification when considered in light of the attached drawings.

BRIEF DESCRIPTION OF THE DRAWINGS

FIG. 1 is a vertical central sectional view of a car wheel equipped with a disc brake constructed in accordance with the invention;

FIG. 2 is a plan view of the disc brake structure removed from the wheel;

FIG. 3 is a vertical section taken along the line 3—3 of FIG. 2 looking in the direction of the arrows;

FIG. 4 is a vertical sectional view taken along the line 4—4 of FIG. 2 looking in the direction of the arrows;

FIG. 5 is an enlarged transverse sectional view of the piston and intermediate member;

FIG. 6 is a view similar to FIG. 5 of a modified form of the invention;

FIG. 7 is a view similar to FIG. 5 of another modified form of the invention;

FIG. 8 is a view similar to FIG. 5 of still another modified form of the invention;

FIG. 9 is a transverse sectional view taken along the line 9—9 of FIG. 8 looking in the direction of the arrows;

FIG. 10 is an enlarged fragmentary sectional view of the anti-friction element of FIG. 8; and FIG. 11 is a view similar to FIG. 5 of another modified form of the invention.

DESCRIPTION OF THE PREFERRED EMBODIMENTS

The present invention relates to disc brakes of the type in which at least one pad is engaged with the opposed surface of a brake disc associated with the wheel of a motor vehicle and rotated therewith. At least one piston is arranged on the side of the pad opposite the disc and hydraulic actuating means for pressing the piston against the disc are provided in a caliper which straddles a portion of the periphery of the disc. The hydraulic means presses the pad against the disc through the piston to brake the rotation of the disc.

In conventional disc brakes of the type described above an uncomfortable and highly objectionable "brake squeal" occurs when the brakes are applied.

Prior art attempts to improve the frictional material and the method of damping has failed to accomplish the essential object of preventing the above-described brake squeal.

In studies and experiments conducted by applicant, it has been determined that the brake system during brake squeal vibrated in a very complicated manner. The frequency of the vibrations producing the brake squeal is in the order of kilohertz and when the vibrations of both the lower frequency and higher frequency, then the brake squeal frequency are excluded, the coupled vibration among the working oil, pistons, pads, calipers and a disc is the cause of the brake squeal. It was confirmed that the unstable force created or the combination of the elastic vibration of the pad and the three dimensional vibration of the piston caused a bending vibration of the pad which resulted in brake squeal. In the instant invention, the brake squeal is prevented by changing the coupled vibration load between the pad and piston.

Referring now to the drawings in detail, wherein like reference characters indicate like parts throughout the several figures, a brake mechanism 3 is secured to a steering knuckle 12 by means of a bolt 14. A hub 5 is journaled on the steering knuckle 12 on bearings 8 and a wheel disc 6 and brake disc 10 are rigidly secured to the hub 5 by bolts 4 and 9. The brake mechanism 3 straddles the disc 10 and the disc cover 11 is fixed to the steering knuckle 12 on the chassis side of the disc 10.

In the brake mechanism 3 a pair of brake pads 50, formed of conventional friction brake material, are supported in opposed relation in a caliper 30 and are disposed on opposite sides of the brake disc 10. The caliper 30 has a hydraulic conduit 20 connected thereto through a fitting 21.

In FIGS. 2 through 5, details of a Girling type disc brake with the invention applied thereto is illustrated. The caliper 30 constitutes the principal part of the brake mechanism 3 and consists of two half portions 31 arranged in opposed relation to each other. The major portion of the caliper 30 between the opposed surfaces of the half portions 31 provide a space in which the brake disc 10 rotates. The two half portions 31 abut at their connecting surfaces 32 above the space in which the brake disc 10 rotates and are rigidly secured together by transversely extending bolts 36. A cylinder 25 is formed in each of the portions 31 opening toward the disc brake 10 in axial alignment.

In the center portion of caliper 30 there is a space formed by the inner side walls 302 of sleeves 301 as can be seen in FIG. 4. In this space two detachable rods 33 extend between and through fixed walls 35 arranged in spaced parallel relation in the upper part of the caliper 30. The rods are held in place by pins 33' and are loosely fitted into the holes 102 of the pad backing plates 51 to suspend two pads 50 with their friction surfaces opposed to the opposite sides of the disc 10.

A spring 34 is bent into a W-shape with the lower portion thereof engaged with one of rods 33. Each free end of the side leg of the spring 34 is engaged in a hole 101 in one of the pad backing plates 51 to normally spring-bias the pads 50 away from the disc 10. With this arrangement the pad 50 is normally held out of contact with the brake disc 10.

The piston 70 is generally cylindrical shape is mounted in each of the cylinders 25 and has a central cylindrical opening terminating in a circular bottom 76. The piston 70 bears against the oil in the cylinder 25 and engages peripherally a resilient O-ring 71 which is mounted in an annular groove in the cylinder 25 to seal the piston 70 therein. The piston 70 is adapted to move toward the disc 10 when pressure is applied to the oil in the cylinder 25.

A ring-shaped resilient boot 72 is secured to the inner end of the cylinder 25 by a ring 73 and has an inner portion thereof which resiliently engages the inner end 75 of the piston 70. Boot 72 provides a dust seal for the piston 70 in its travel in the cylinder 25 to prevent contamination of the hydraulic oil therein.

A generally cylindrical intermediate member 60 is mounted in the piston 70 against the bottom 76 thereof. An O-ring 64 is mounted in a peripheral groove in the intermediate member 60 and engages the sides of the hollow piston 70. The intermediate member 60 is positioned within the piston 70 so that their respective axes coincide.

A relatively large bore 63 extends axially into the outer face of the intermediate member 60 and a relatively large bore 67 extends axially into the inner face of the intermediate member 60. An exhaust port 65 communicates with the bore 63 with the bore 67 and is normally closed with a screw 66 having a rubber washer 66' positioned thereon for sealing. A felt 69 impregnated with grease is mounted in the bore 67 in engagement with the bottom 76 of the piston 70. The opposite side of the intermediate member 60 engages the back plate 51 of the pad 50 so that movement of the piston 70 causes the intermediate member 60 and the pad 50 to move toward the disc 10. The inner surface of the intermediate member 60 and the bottom 76 of the piston 70 have a film of grease lying therebetween to eliminate friction between the intermediate member 60 and the piston 70. The inner surface of the intermediate member 60 and the bottom 76 of the piston 70 extends substantially parallel to the side of the disc 10.

The intermediate member 60 is inserted into the piston 70 by removing the screw 66 from the exhaust port 65. The piston is full of grease and the felt 69 is sufficiently impregnated with grease so that some grease is retained therein. The intermediate member 60 is then inserted into the piston 70 with the air and grease trapped between intermediate member 60 and the piston 70 may permit escape through the exhaust 65. The screw 66 is then screwed into the exhaust port 65 to seal the exhaust port 65. The exhaust port 65 serves as a supply port for introducing grease into the piston 70 and a tool can be attached thereto for pulling the intermediate member 60 out of the piston 70 when repairing the brakes.

In some instances an exhaust port can be provided between the intermediate member 60 and the piston 70 by making the sealing ring 64 discontinuous.

A bore (not shown) in the caliper 30 connects the cylinders 25 with the hydraulic conduit 20 through fitting 21 so that both of the pistons 70 are moved simultaneously toward the disc 10 while pressure is applied to the brake fluid in the cylinders 25.

The disc brake in accordance with the embodiment described above is operated by applying pressure to the hydraulic brake fluid in the cylinder 25 from a master cylinder (not shown) so that the pads 50 are forced against the disc 10 to apply braking action thereto. Each piston 70 slides in its respective cylinder 25 and its bottom surface 76, pressing against the intermediate member 60, pushes the backing plate 51 against the pads 50 which in turn engages the brake disc 10.

The use of grease between the intermediate member 60 and the bottom surface 76 of the piston 70 greatly decreases the frictional forces between intermediate member 60 and the piston 70. On the other hand, the frictional forces between the intermediate member 60 and the pad baking plate 51 is extremely great when compared with the frictional force between the piston 70 and the bottom surface 76. The friction between the intermediate member 60 and the pad backing plate 51 increases the effective weight of the pad 50 and thus reduces the tendency to vibrate.

The coupled vibration between the pad 50 and the piston 70 which produces the bending vibration of the pad 50 and the pad backing plate 51 is minimized by the low friction sliding motion between the intermediate member 60 and the piston bottom surface 76. Since the sliding surface between the intermediate member 60 and the piston bottom 76 is in a position spaced from the opposite side of the piston at the pad and near to the piston at the hydraulic fluid, rocking of the piston 70 due to the clearance between the piston 70 and to the cylinder wall is effectively decreased, with the result that the coupled vibration is minimized. The bending vibration of the pad 50 is eliminated by this action and thus no brake squeal occurs.

The space between the grease and the source of frictional heat between the disc 10 and the pad 50 is such that this heat is dissipated without being transmitted to any degree to the grease so that the quality of the grease is not deteriorated.

The ring 64 tends to anchor the intermediate member 60 when the brake is at rest eliminating the sounds that would otherwise occur due to the rocking of the intermediate member in the piston 70. The ring also tends to hold the intermediate member completely within the piston 70 so as to prevent delay of transmission of a pressing force by the pad during braking.

In the embodiment of the invention illustrated in FIG. 6, a piston 70' identical to the piston 70 in the first form of the invention has an intermediate member 60' associated therewith.

The intermediate member 60' has a sealing ring 64' positioned in a circumferential groove extending therearound. The sealing ring 64' engages the inner wall of the piston 70 to seal intermediate member 60' with respect thereto. The intermediate member 60' has a relatively large bore 63' opening inwardly thereof from the outer face. An exhaust port 65' extends from the bore 63' through the inner face 61' of the intermediate member 60'. A resilient bellows 82 engages in a recess 68 surrounding the exhaust port 65' with the bellows 80 completely covering the exhaust port 65'.

An iron disc 92 is interposed as the pressing member between the back end surface 61' of the intermediate member 60' and the piston bottom surface 76'. Lubricating oil 80 is injected into the space enclosed by the bellows 82, the intermediate member 60' and the hollow part of the piston 70.

In assembling the piston 70 with the intermediate member 60', the iron plate 92 is first disposed at the bottom surface 76' of the piston 70 and piston 70 is then filled with lubricating oil 80. The intermediate member 60' with the bellows 82 detached is then inserted into the piston 70 with surplus oil 80 overflowing through the exhaust port 65'. The intermediate member 60' is then pressed inwardly until the surface 61' thereof comes in contact with the surface 96 of the iron disc 92 with the pressure continuing until the surface 97 of the disc 92 is in contact with the bottom 76' of the piston 70. The exhaust port 65' is then closed by attaching the bellows 82 to the groove 68 with the bellows slightly crushed.

In this embodiment of the invention the results are identical to that of the embodiment described in FIGS. 1 through 5. In this embodiment, sliding surfaces are formed with the oil 80 both between the back end surface 61' of the intermediate member 60' and the forward end surface 96 of the pressing member 92, and between the back end surface 97 of the pressing member 92 and the piston bottom surface 76' respectively. The coupled vibrations are eliminated in this embodiment of the invention for the same reason as in the first embodiment and with a second sliding surface being provided, the effect is improved. The use of the bellows 82 provides an opening through which the lubricating oil can be injected while simultaneously serving as a supply reservoir for oil, should any be lost by leakage. Expansion of the lubricating oil or air on rare occasions intermixed is effectively compensated by the elongation of the bellows 82.

In the third embodiment of the instant invention, as illustrated in FIG. 7, a piston 70 is provided with a modified intermediate member 60" which is an iron disc loosely inserted in the hollow part of the piston 70. An iron powder sinter member 93 impregnated with lubricant is disposed between the intermediate member 60" and the bottom surface 76" of the hollow part of the piston 70.

In this third embodiment, the lubricant is impregnated into the pores of the sinter member 93, and low frictional sliding surfaces are formed both between the sinter member 93 and the intermediate member 60" and between the sinter member 93 and the piston bottom surface 76". Therefore, the same operation and effect of the sliding surfaces occurs in this embodiment as in the case of the first and second embodiments. In case the lubricant between the sliding surfaces decreases, then additional lubricant will ooze out of the sinter member onto the surfaces so as to maintain the sliding surfaces in their low frictional condition.

The lubricant in the sinter member 93 only oozes out moderately onto the sliding surfaces an hence no leaking outward occurs which eliminates the need for the sealing rings of the other forms of the invention.

The use of the sinter member and its lubricated surfaces effectively reduces the vibration and completely prevents the formation of a squeal during operation of the brakes. As pressure is applied to the sinter member from the piston to the intermediate member 60", there is a squeezing action which assists in causing the lubricant to ooze from the pores of the sinter member with the lubricant being reabsorbed into the sinter member as the pressure is removed.

In the next embodiment of the invention, as illustrated in FIGS. 8 to 10, the piston 70 is provided with an intermediate member 60''', which is a cylindrical member similar to the intermediate member 60". As an antifriction separation between the surface 61''' of the intermediate member 60''' and the bottom surface 76''', a plurality of ball bearings 94 are mounted in a supporting plate 941 which has a diameter slightly less than that of the hollow piston 70'. The balls 94 are spaced regularly on the plate 941 and are secured thereto for rolling motion therein. The balls 94 project outwardly on both sides of the plates 941 and projections 942 on the plates 941 effectively support the balls 94 therein.

The galls 94 engage the surface 61''' of the intermediate members 60''' and the bottom surface 76''' to provide an anti-friction connection therebetween. The rotation of the balls 94 minimizes the friction between the face 61''' of the intermediate member 60''' and the face 76''' of the piston 70 and thus eliminates the brake squeal as in the preceding modifications. The balls 94 can rotate freely in any direction and will be effective in eliminating frictional forces between the surface 61''' and the surface 76''' regardless of the transverse direction of such forces.

Another modification of the invention is illustrated in FIG. 11, wherein the piston 70 is provided with an intermediate member 60'''' which engages in the hollow portion of the piston 70 with its inner face 61'''' arranged in spaced parallel opposed relation to the bottom surface 76'''' of the piston 70. Five identical circular plates 95 having a diameter slightly less than that of the intermediate member 60'''' are interposed in contacting relation between the intermediate members 60'''' and the piston 70. The five plates 95 produce six sliding surfaces which are all lubricated to produce a minimum of friction therebetween. The use of five plates 95 produces a tremendous increase in area of the available sliding surfaces, thus producing extremely low frictional characteristics.

In the instant invention, whenever lubricating materials, greases, oils or the like are mentioned in the specification, it should be understood that materials such as molybdenum disulphide, grease mixed with molybdenum disulphide, graphite powder, nylon powder, polytetrafluoroethylene powder and the like, may be used.

The intermediate member in each instance may be formed of metal or plastic material strong enough to withstand the pressing force of the piston when pressing the pad against the disc. The intermediate member may be fixed to the pad since it moves with the pad during the brake operation.

The plates 95 in FIG. 11 may be formed of metal or polytetrafluoroethylene plates alternately superimposed with metal. Nylon and polyethylene may also be used. The plates formed of polytetrafluoroethylene are in of themselves effective in minimizing the vibration because of the damping effect of the material itself.

The disc brake, in accordance with the present invention, operates as follows: the piston pressing the pad against the disc by suitable pressing means such as hydraulic actuating means, as a hollow portion cylindrical in shape which carries the cylindrical intermediate member therein. Pressure from the piston to the pad is exerted through the intermediate member and means interposed between the intermediate member and the piston reduces the frictional contact therebetween so as to lessen the transmission of vibration between the pad and the piston.

The rocking of the piston is also reduced by use of the seal ring between the piston and the cylinder as well as the seal ring between the intermediate member and the piston. The apparent weight of the pad is increased since the intermediate member moves with the pad. The increased weight of the pad, due to the intermediate member in and of itself, minimizes the vibrations which are transmitted from the pad to the piston. As stated above, any minimization of the vibrations is effective in reducing brake squeal.

Having thus described the preferred embodiments of the invention, it should be understood that numerous structural modifications and adaptations may be resorted to without departing from the spirit of the invention.

We claim:

1. A disc brake comprising a rotatable disc, a caliper straddling a portion of the periphery of said disc, a pad of friction material associated with the caliper and opposed to the disc, an axially movable piston in the caliper hydraulically movable to force the pad into frictional engagement with the disc for braking action, an axial cylindrical hollow portion opening into the side of the piston adjacent said pad, an intermediate cylindrical member inserted into said hollow portion, said hollow portion having a flat inner bottom surface extending substantially parallel to the rotating plane of said disc, said intermediate member having a flat inner surface opposed to the bottom surface of the hollow portion and an outer surface in frictional engagement with the pad, sliding surfaces on the inner surface of said intermediate member and the inner bottom surface of the hollow portion of said piston so as to allow the pad to slide a predetermined limited distance with respect to the piston, antifriction means interposed between the adjacent flat inner surfaces of said intermediate member and the hollow portion of the piston, whereby to isolate the coupled vibration between the disc, pad, piston and caliper to eliminate brake squeal, and means interposed between said cylindrical member and cylindrical hollow portion to retain said anti-friction means between said flat inner surfaces.

2. A disc brake according to claim 1, wherein said anti friction means comprises a lubricating material interposed between the adjacent flat inner surfaces of said intermediate member and the hollow portion of said piston.

3. A disc brake according to claim 2, wherein said lubricating material is a liquid lubricant.

4. A disc brake according to claim 2, wherein said lubricating material is a solid lubricant powder and is interposed between the adjacent flat inner surfaces of said intermediate member and the hollow portion of said piston.

5. A disc brake according to claim 1, wherein at least one relatively large bore is provided on the inner surface of said intermediate member opposed to and contacted with the inner bottom surface of the hollow portion of said piston and said antifriction means comprises a filler consisting of porous material impregnated with a liquid lubricant disposed in said bore.

6. A disc brake according to claim 5, wherein an annular groove is provided circumferentially along the outerwall of said intermediate member and said retaining means comprises a sealing ring member disposed in said groove to seal a space existing between said intermediate member and said piston whereby the leakage of the liquid lubricant is prevented.

7. A disc brake according to claim 1, wherein said anti-friction means comprises at least three anti-friction balls provided between the inner surfaces of said intermediate member and the bottom surface of said hollow portion of the piston and supported rotatably.

8. A disc brake according to claim 1 wherein said retaining means comprises a supporting plate having holes symmetrically arranged about its center and said balls are supported rotatably in the respective holes.

9. A disc brake according to claim 8, wherein said supporting plate is composed of two plates having projections disposed about each of said holes, said plates being bonded together between said holes.

10. A disc brake according to claim 1, wherein a plate member made of hard, low friction material is interposed between the inner surface of said intermediate member and the inner bottom surface of said hollow portion of said piston.

11. A disc brake according to claim 10 wherein said plate member is held against the inner surface of said intermediate member.

12. A disc brake according to claim 10 wherein said plate member is formed of material selected from the group consisting of low frictional metal, sintered material and synthetic resin.

13. A disc brake according to claim 12 wherein said plate member is made of metal and coated with a layer made of solid lubricant which is selected from the group consisting of molybdenum disulphide, graphite, a mixture of said metals, polyamide resin, polytetrafluoroethylene, a mixture of said resin, talc and a mixture of talc and said resin.

14. A disc brake according to claim 10, wherein said plate member is formed from a sintered material impregnated with a liquid lubricant.

15. A disc brake according to claim 14, wherein a bore extends axially into the outer surface of said intermediate member, a passage is provided in said intermediate member to interconnect the inner surfaces of said intermediate member and the bore in its outer surface, and said anti-friction an expandable member associated with said passage to hold liquid lubricant therein.

16. A disc brake according to claim 15, in which said intermediate member has an annular groove extending circumferentially in the outer wall of the extending circumferentially in the outer wall of the intermediate member, and said retaining means comprises a sealing ring member disposed in said groove to seal the space existing between the intermediate member and piston whereby the leakage of the liquid lubricant is prevented.

* * * * *